(12) United States Patent
Ehl (10) Patent No.: US 8,910,740 B2
(45) Date of Patent: Dec. 16, 2014

(54) ROAD VEHICLE CHASSIS AND ROAD VEHICLE

(71) Applicant: Hymer AG, Bad Waldsee (DE)

(72) Inventor: Stefan Ehl, Ravensburg (DE)

(73) Assignee: Hymer AG, Bad Waldsee (DE)

( * ) Notice: Subject to any disclaimer, the term of this patent is extended or adjusted under 35 U.S.C. 154(b) by 0 days.

(21) Appl. No.: 14/087,362

(22) Filed: Nov. 22, 2013

(65) Prior Publication Data
US 2014/0151141 A1    Jun. 5, 2014

(30) Foreign Application Priority Data

Nov. 30, 2012  (EP) .................................... 12008054

(51) Int. Cl.
| | |
|---|---|
| *B62D 21/02* | (2006.01) |
| *B62D 21/10* | (2006.01) |
| *B60P 3/32* | (2006.01) |
| *B62D 63/02* | (2006.01) |
| *B60K 5/00* | (2006.01) |
| *B62D 29/04* | (2006.01) |

(52) U.S. Cl.
CPC . *B62D 21/02* (2013.01); *B60P 3/32* (2013.01); *B62D 63/025* (2013.01); *B62D 21/10* (2013.01); *B60K 5/00* (2013.01); *B62D 29/041* (2013.01)
USPC ........................................... 180/311; 280/785

(58) Field of Classification Search
USPC ........... 180/311; 280/781, 785, 798; 296/156, 296/168
See application file for complete search history.

(56) References Cited

U.S. PATENT DOCUMENTS

| | | | | |
|---|---|---|---|---|
| 4,514,007 | A * | 4/1985 | Macht ........................... | 180/311 |
| 5,921,615 | A * | 7/1999 | Gimenez ....................... | 296/164 |
| 8,474,870 | B1 * | 7/2013 | Ng et al. ....................... | 280/785 |
| 8,534,412 | B2 * | 9/2013 | Huhn et al. ................... | 180/312 |
| 2002/0017407 | A1 * | 2/2002 | Takeda ......................... | 180/68.5 |
| 2002/0023786 | A1 * | 2/2002 | Kamikawa .................... | 180/6.7 |
| 2008/0053739 | A1 * | 3/2008 | Chernoff et al. ............. | 180/400 |
| 2009/0033127 | A1 * | 2/2009 | Duerr et al. ............. | 296/203.01 |
| 2009/0188100 | A1 * | 7/2009 | Durney et al. ................ | 29/469 |

FOREIGN PATENT DOCUMENTS

| | | |
|---|---|---|
| DE | 32 42 564 A1 | 5/1984 |
| DE | 41 33 401 A1 | 4/1993 |
| EP | 2 423 077 A2 | 2/2012 |
| EP | 2 520 461 | 11/2012 |

OTHER PUBLICATIONS

European Search Report (Application No. 12008054.4) dated Apr. 22, 2013.

* cited by examiner

*Primary Examiner* — Drew Brown
(74) *Attorney, Agent, or Firm* — Burr & Brown, PLLC (57) ABSTRACT

The invention relates to a road vehicle chassis comprising a front chassis, a rear chassis and flange means, wherein the front chassis and the rear chassis are connected together to form the road vehicle chassis by the interposition of the flange means and wherein the front chassis comprises front wheel suspension fastening means and the rear chassis comprises rear wheel suspension fastening means. In this case, the rear chassis is configured as a lightweight sandwich construction chassis, wherein the lightweight sandwich construction chassis comprises a plurality of sandwich plates, wherein the sandwich plates are configured as longitudinal members, crossmembers, a top chord and a bottom chord, wherein the sandwich plates are connected together such that the sandwich plates form a three-dimensional structure, wherein the three-dimensional structure is defined at the top by the top chord and at the bottom by the bottom chord, wherein adjacent sandwich plates are connected together.

15 Claims, 12 Drawing Sheets

ROAD VEHICLE CHASSIS AND ROAD VEHICLE

CROSS REFERENCE TO RELATED APPLICATION

This application claims the benefit under 35 USC §119(a)-(d) of European Application No. 12008054 filed Nov. 30, 2012, the entirety of which is incorporated herein by reference.

FIELD OF THE INVENTION

The invention relates to a road vehicle chassis and a road vehicle.

BACKGROUND OF THE INVENTION

A road vehicle chassis is disclosed in EP 2 423 077 A2, the road vehicle comprising a front chassis, a rear chassis and flange means, wherein the front chassis and the rear chassis are connected together to form the road vehicle chassis by the interposition of the flange means and wherein the front chassis comprises front wheel suspension fastening means and the rear chassis comprises rear wheel suspension fastening means. In such road vehicle chassis, the front and the rear chassis are designed with a metal structure. It is only possible to reduce the weight by exclusively using expensive metals, such as for example aluminum, and/or by using special components which are costly in terms of construction and production technology.

SUMMARY OF THE INVENTION

It is the object of the invention to propose a road vehicle chassis and/or a road vehicle, the weight thereof due to the chassis being significantly reduced relative to a chassis produced in a metal construction by avoiding the use of expensive light metals and/or by avoiding the use of special components which are costly in terms of construction and production technology and the chassis thereof providing increased value relative to the use of the chassis space taken up by the chassis.

In the road vehicle chassis according to the invention, the rear chassis, which together with the front chassis forms the road vehicle chassis, is configured as a lightweight sandwich construction chassis, wherein the lightweight sandwich construction chassis comprises a plurality of sandwich plates, wherein the sandwich plates are configured as longitudinal members, crossmembers, a top chord and a bottom chord, wherein the sandwich plates are connected together such that the sandwich plates form a three-dimensional structure, wherein the three-dimensional structure is defined at the top by the top chord and at the bottom by the bottom chord and wherein adjacent sandwich plates are connected together. By the use of a three-dimensional sandwich structure for the rear chassis it is possible with little effort in terms of construction and using materials which may be produced and processed cost-effectively and simply, to reduce the weight of the road vehicle chassis and to utilize more effectively the free spaces produced in the chassis, as the longitudinal members are arranged standing upright in the direction of travel and the crossmembers are arranged standing upright transversely to the direction of travel and thus form between the top chord and the bottom chord hollow spaces which are geometrically simple and, as a result, very useful. The essential feature of the invention is, therefore, a reduction in weight and the dual use of a space located between the top chord and the bottom chord for producing a chassis which is flexurally rigid and torsionally rigid and for forming useful hollow spaces.

For the connection of adjacent, in particular T-shaped, sandwich plates abutting one another or intersecting one another, according to the present invention, it is provided, in particular, to interlock and/or to bond and/or to screw the sandwich plates to one another, in particular by using fittings. As a result, stable three-dimensional structures may be produced in a simple and rapid manner.

According to the present invention, the lightweight sandwich construction chassis comprises at least two longitudinal members which are both connected by one of the flange means to the front chassis and comprise the rear wheel suspension fastening means, wherein the rear wheel suspension fastening means are configured, in particular, as bores incorporated in the longitudinal members and/or as threaded portions incorporated in the longitudinal members and/or as threaded bolts arranged on the longitudinal member and/or as a bonded connection. A continuous design of the longitudinal members between the main points of force introduction simplifies the technical configuration of the longitudinal members as with this configuration no connecting points whatsoever have to be taken into consideration.

According to the invention, it is further provided to configure the three-dimensional structure of the rear chassis as a self-supporting three-dimensional structure, wherein the three-dimensional structure is configured, in particular, such that by means of the sandwich plates which are connected together at least three, in particular cuboidal, modules are formed and arranged, in particular, symmetrically to a vehicle longitudinal axis, the modules being arranged in the direction of travel, in particular in succession and adjacent to one another, wherein one of the modules is arranged, in particular, such that the crossmembers thereof are arranged upstream and downstream of a point of installation for the rear wheels, wherein the sandwich plates used for the three-dimensional structure have a plate thickness, in particular, of between 20 mm and 40 mm and preferably 25 mm to 35 mm, wherein the top chord and the bottom chord are at a distance relative to one another, in particular, of 350 mm to 450 mm and preferably of 400 mm to 430 mm and wherein the longitudinal members, in particular, have a length of 2 m to 4 m and preferably of 3 m to 3.6 m. Such a design of the three-dimensional structure may be produced in a simple manner by its large-volume modules. Moreover, the modules of such a three-dimensional structure may also be optimally utilized due to the arrangement and size thereof.

The present invention also provides to connect the longitudinal members of the rear chassis and the supporting members of the front chassis by using the flange means, wherein the longitudinal members and the supporting members in each case form connecting points. By the use of flange means, the front chassis and the rear chassis are reliably connected in a simple manner.

According to the invention, the front chassis is configured as a metal chassis. The use of a conventional metal chassis as a front chassis together with a lightweight sandwich construction chassis designed as a rear chassis results in a vehicle chassis which is able to be produced in a simple manner, as only structures of the rear chassis which are simple in comparison with the front chassis are replaced by a lightweight sandwich construction. Such a hybrid vehicle chassis integrates the lightweight sandwich construction in the vehicle structure in a particularly simple manner.

Moreover, the invention provides that at least one connecting point of the front chassis is configured as a hollow profile and at least one connecting point of the rear chassis is formed by one of the longitudinal members, wherein the connection is made either such that the longitudinal member protrudes, in particular positively, into the hollow profile and is connected by the flange means to the hollow profile or the longitudinal member bears externally against the hollow profile and is connected by the flange means to the hollow profile. As a result, it is also possible to use front chassis, which are designed with a metal construction for combining with a rear chassis having a metal construction, for a rear chassis designed with a lightweight sandwich construction.

The invention also provides to equip the rear chassis with at least three, and in particular four, crossmembers which pass through the rear chassis transversely to the direction of travel. As a result, two to three modules are produced which provide the rear chassis with a high degree of flexural rigidity and a high torsional rigidity over its entire length.

It is also provided to design at least two, and in particular three, adjacent crossmembers in each case with a through-hole and thus to form between the top chord and the bottom chord a tunnel which extends in the longitudinal direction of the vehicle. As a result, a flexible and useful large space is produced, in spite of the design of the rear chassis with a plurality of modules between the top chord and the bottom chord.

According to the invention, it is also provided that the individual flange means also comprise at least one gusset plate for connecting the front chassis and the rear chassis, wherein the gusset plate is connected, and in particular screwed, to the front chassis and the rear chassis. As a result, an optimal connection of the metal structure of the front chassis and the lightweight sandwich construction of the rear chassis is possible, as with an appropriate design the gusset plate ensures a coupling of the rear chassis to the front chassis over a large surface area.

The present invention also provides that a seat belt bracket, for attaching safety belts for seats arranged on the rear chassis, is connected to one of the longitudinal members and/or to one of the crossmembers, wherein the seat belt bracket is also supported, in particular, by a side arm on the top chord of the lightweight sandwich construction. As a result, force may be introduced from the seat belt bracket in differently oriented planes of the lightweight sandwich construction and thus provide an optimal connection between the seat belt bracket and the lightweight sandwich construction.

For designing the lightweight sandwich construction chassis according to the present invention, in principle three different shapes are provided. According to the first shape, the lightweight sandwich construction chassis is configured such that the top chord in the direction of travel protrudes laterally on both sides over the bottom chord, wherein the top chord protrudes laterally over the longitudinal members and wherein the bottom chord terminates flush with the longitudinal members to the side, wherein in particular at least one of the crossmembers exclusively extends between the longitudinal members and, in particular, has a length of 1.2 m to 1.4 m and preferably of 1.25 m to 1.35 m. As a result, a stable three-dimensional structure is formed which subsequently permits a design which is appropriate for the respective requirements for the vehicle structure below the top chord protruding laterally over the longitudinal members. According to the second shape, in particular, at least one of the crossmembers protrudes on both sides over the longitudinal members and has, in particular, a length of 2 m to 2.5 m and preferably a length of 2.2 m to 2.3 m. As a result, it is ensured that the top chord is supported against loads acting from above onto the top chord and in edge regions located parallel to the vehicle longitudinal axis. According to the third shape, the top chord and the bottom chord protrude laterally on both sides over the longitudinal members, wherein in particular at least one of the crossmembers protrudes on both sides over the longitudinal members and, in particular, has a length of 2 m to 2.5 m preferably a length of 2.2 m to 2.3 m. As a result, in addition to the modules arranged between the longitudinal members, further modules are produced which additionally reinforce the lightweight sandwich construction.

The invention also provides that the flange means comprise at least one adapter, wherein the adapter is arranged between the front chassis and the rear chassis. As a result, it is possible to adapt different structures of the front chassis and the rear chassis to one another without altering the front chassis or rear chassis and thus to save costs. Moreover, as a result, one shape of a rear chassis may be combined with a plurality of shapes of a front chassis. Also, it is possible to combine different types of rear chassis with one type of front chassis in a simple manner.

According to a first variant, a road vehicle according to the present invention comprises, in addition to a road vehicle chassis, an engine which is configured, in particular, as an internal combustion engine and is mounted in the front chassis and drives front wheels or front wheels and rear wheels. Such a vehicle may be configured to be more lightweight with little effort compared to a road vehicle in which the rear chassis is designed with a metal construction.

According to a second variant, a road vehicle according to the invention comprises, in addition to a road vehicle chassis, an engine which is configured, in particular, as an internal combustion engine and is mounted in the rear chassis and drives rear wheels or rear wheels and the front wheels. Such a vehicle may be configured to be more lightweight with little effort compared to a road vehicle in which the rear chassis is designed with a metal construction.

According to a further variant, a road vehicle having a road vehicle chassis according to the invention comprises a road vehicle or a road vehicle having a road vehicle chassis, wherein the top chord of the rear chassis, in particular, forms a bottom surface of a living space, wherein supply units and/or containers are arranged, in particular, between the top chord and the bottom chord in modules defined by the longitudinal members and the crossmembers, wherein at least one of the modules is accessible, in particular, through a through-hole in one of the two crossmembers which define the module, wherein at least one of the modules is accessible, in particular, through a through-hole in the left-hand longitudinal member and, in particular, through a through-hole in the right-hand longitudinal member, wherein the top chord and/or the bottom chord is and/or are configured, in particular, as (an) individual sandwich plate(s), which counter to the direction of travel protrude(s) over rear wheels of the road vehicle and wherein the longitudinal members protrude, in particular, over the crossmember furthest to the front and/or over the crossmember furthest to the rear, wherein a projection over the crossmember furthest to the front is, in particular, at least 20 cm, wherein a projection over the crossmember furthest to the rear is, in particular, at least 20 cm. Such a road vehicle has a plurality of the above-mentioned advantages and according to the present invention is designed, in particular, as a motorhome or campervan.

Within the meaning of the invention, 'module' is understood as, in particular, a cuboidal hollow space which is defined by at least five sandwich plates and, in particular, by six sandwich plates which are arranged, in particular, at right angles to one another.

Within the meaning of the invention, 'chassis space' is understood as the space which is defined by a shell-like covering of the chassis. The chassis space is, on the one hand, filled by the chassis itself and, on the other hand, configured by hollow spaces which are defined and/or bordered by the chassis.

Within the meaning of the invention, 'sandwich plate' is understood as an at least triple-layered plate which comprises a core layer made of polypropylene (PP), in particular expanded polypropylene (EPP), and an upper top layer and a lower top layer made of material having tensile strength, in particular aluminum, wherein the superimposed layers are connected, in particular bonded or welded or fused together. In the sandwich plate, the core layer has a thickness which is at least 10 times and, in particular, at least 20 times the thickness of the upper top layer or the lower top layer, wherein the upper top layer and the lower top layer, in particular, have the same thickness.

Within the meaning of the invention, 'flange means' is not only understood as mechanical components such as screws and/or nuts and/or washers and/or gusset plates, but bonded connections are also regarded as flange means which are suitable for connecting the front chassis and the rear chassis.

Within the meaning of the invention, 'gusset plate' is understood as metallic or non-metallic connecting components, such as for example angle brackets or fish-plates which are connected to a front chassis and a rear chassis or to a front chassis and an adapter or to a rear chassis and an adapter or to a front chassis, an adapter and a rear chassis.

BRIEF DESCRIPTION OF THE DRAWINGS

Further details of the invention will be described in the drawings with reference to exemplary embodiments shown schematically.

DETAILED DESCRIPTION OF THE INVENTION

Figure 1:
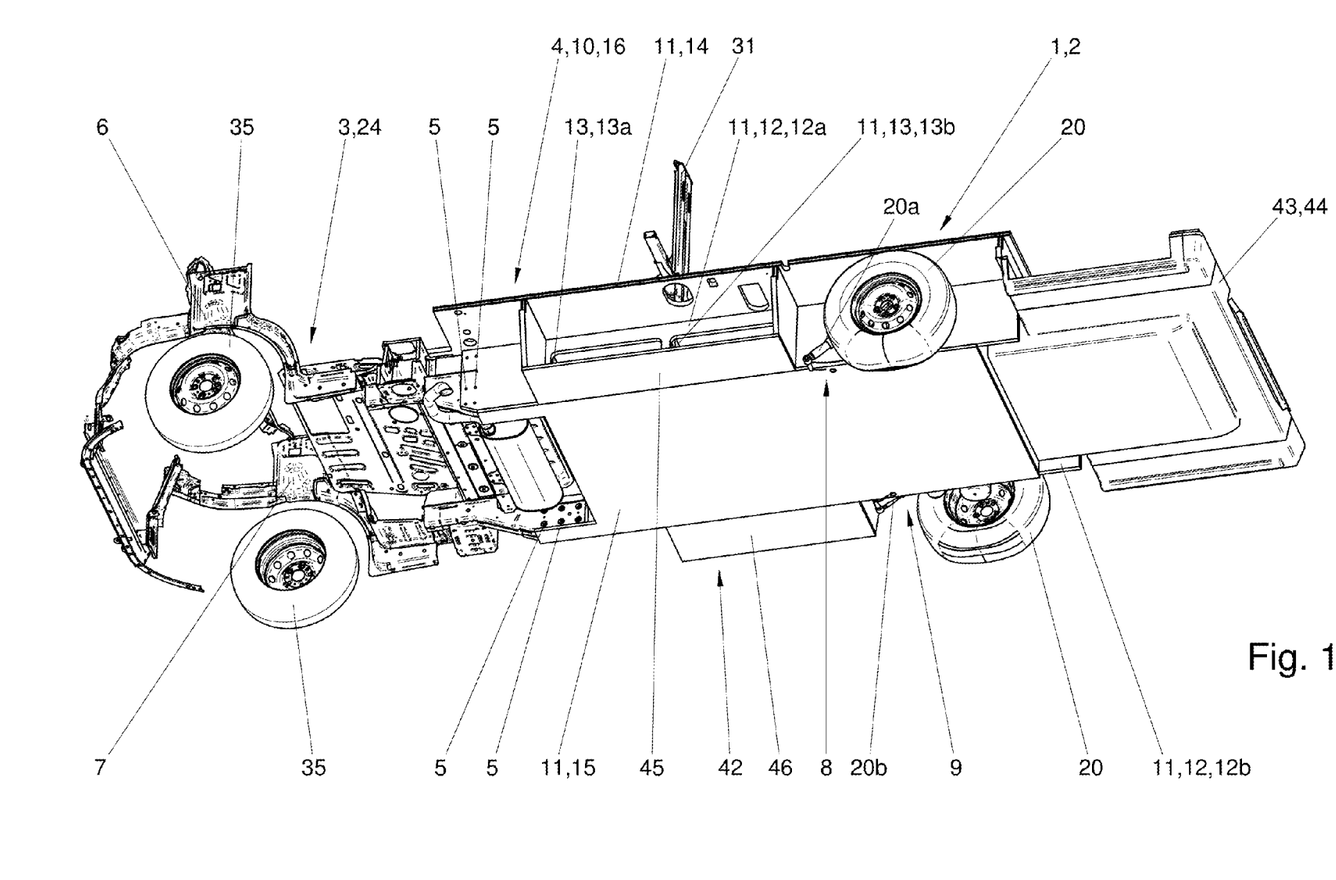
FIGS. 1 to 5 show perspective views of a first variant of a vehicle chassis.

A perspective view of a road vehicle chassis 1 for a motorhome and/or campervan is shown in FIG. 1, the road vehicle chassis being provided with rear wheels 20 and front wheels 35. The road vehicle chassis 1 is shown in a perspective in which the view runs obliquely from below over an underbody 42 of the road vehicle chassis 1. The road vehicle chassis 1, which is also denoted as a campervan chassis 2, comprises a front chassis 3 and a rear chassis 4. The two chassis parts 3, 4 are connected together by flange means 5. In the first variant shown in FIGS. 1 to 6 of the road vehicle chassis 1, individual flange means 5 are denoted by way of example and designed as screw connections which in each case comprise a screw and a nut. The front chassis 3 is configured as a metal chassis 24 and comprises front wheel suspension fastening means 6, 7 for fastening a suspension unit, not shown, for the front wheels 35. The rear chassis 4 is designed as a lightweight sandwich construction 10 in the form of a three-dimensional structure 16 and comprises rear wheel suspension fastening means 8, 9 for fastening suspension units 20a and 20b for the rear wheels 20. The rear chassis 4 comprises a plurality of sandwich plates 11 which are connected together to form the three-dimensional structure 16. Two longitudinal members 12 of the three-dimensional structure 16 may be seen in FIG. 1, the longitudinal members being designed as left-hand longitudinal members 12a and right-hand longitudinal members 12b. Moreover, two crossmembers 13 may be seen, the crossmembers being designed as first crossmembers 13a located furthest to the front and second crossmembers 13b. The longitudinal members 12 and the crossmembers 13 are arranged on end between a top chord 14 and a bottom chord 15. The lightweight sandwich construction chassis 10 is extended to the rear by a rear attachment 43, wherein the rear attachment 43 is designed as a trough-shaped attachment 44 which is screwed and/or bonded to at least two of the sandwich plates 11.

Figure 2:
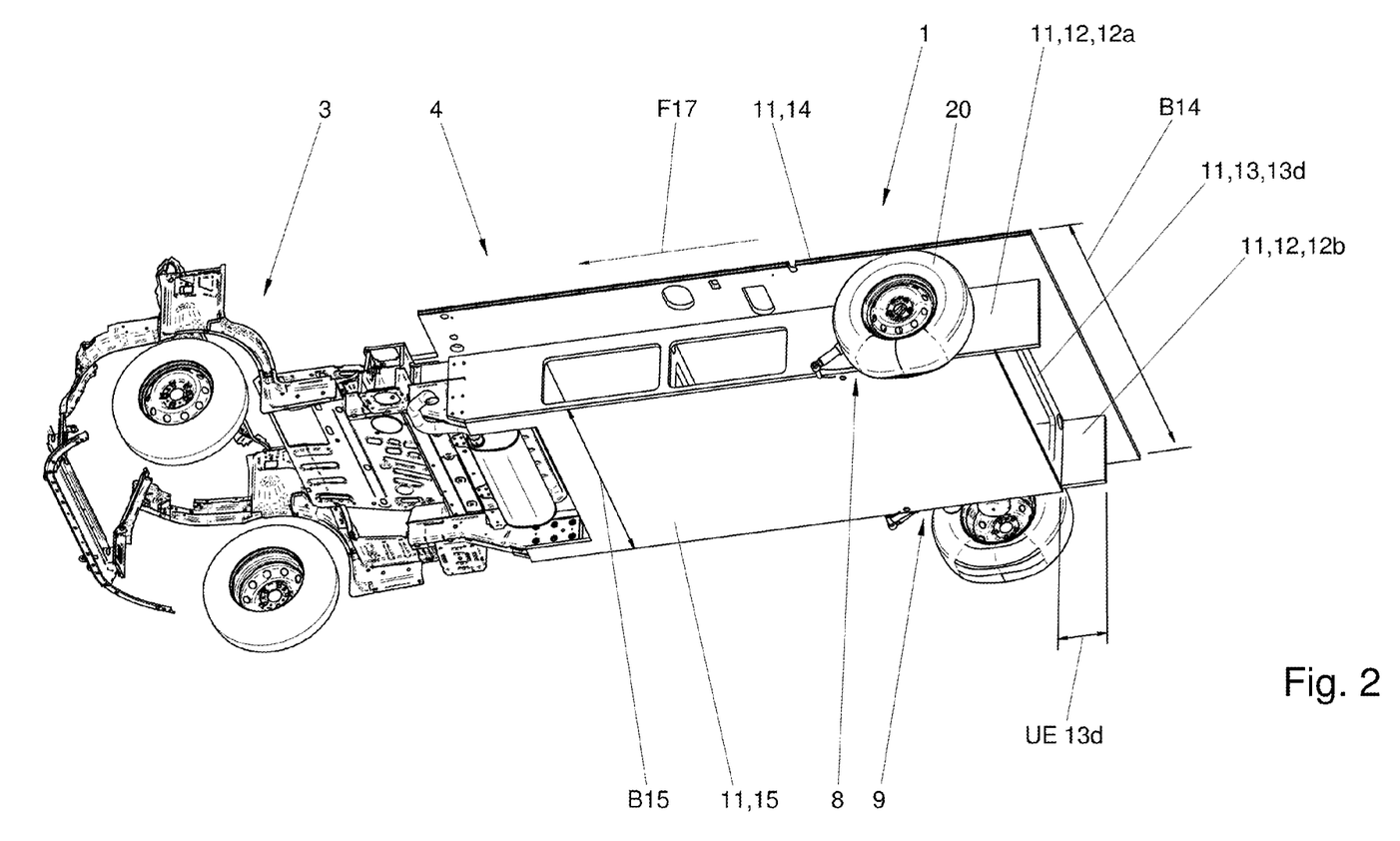

The road vehicle chassis shown in FIG. 1 is shown in FIG. 2 without the rear attachment 43. Moreover, in FIG. 2 the view of a left-hand storage compartment attachment 45, a right-hand storage compartment attachment 46 and a seat belt bracket 31 have been dispensed with (see FIG. 1). In FIG. 2, therefore, relative to the rear chassis 3, only the sandwich plates 11 which undertake load-bearing functions are shown. Between the longitudinal members 12 a fourth crossmember 13d may also now be seen. Viewed counter to a direction of travel F17, the longitudinal members 12 and/or 12a, 12b protrude by a projection UE13d over the crossmember 13d furthest to the rear. The top chord 14 and the bottom chord 15 have a width B14 and/or B15, wherein the top chord 14 extends over the two longitudinal members 12a, 12b and over the bottom chord 15, viewed transversely to the direction of travel F17. The bottom chord 15 extends counter to the direction of travel F17 as far as to the rear of the rear wheel suspension fastening means 8, 9 which are substantially located between the rear wheels 20.

Figure 3:
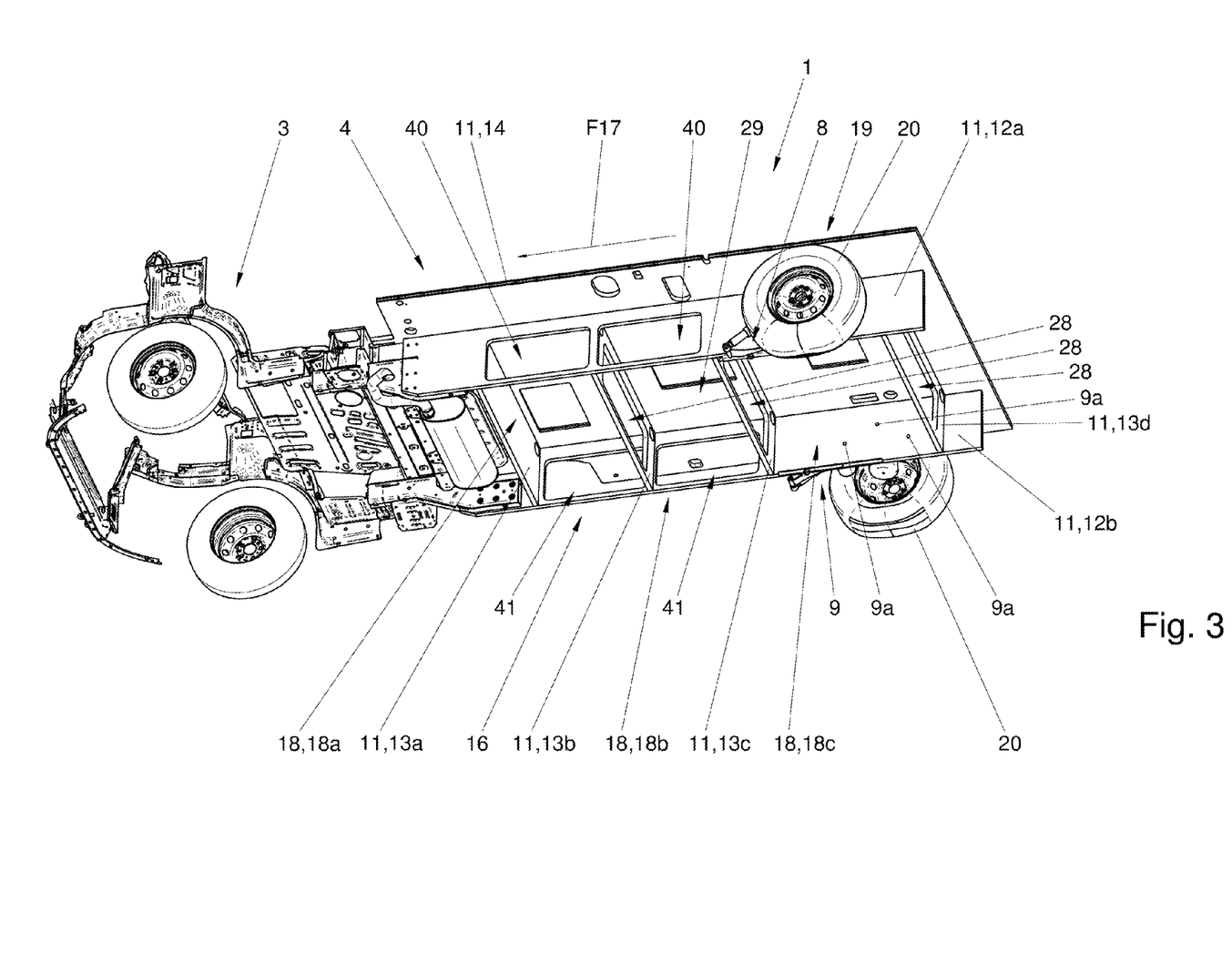

The road vehicle chassis 1 corresponding to the view of FIG. 2 is shown in FIG. 3, wherein the bottom chord 15 (see FIG. 2) is omitted in order to expose the view of the interior of the three-dimensional structure 16 of the rear chassis 4. It may be seen in FIG. 3 how three cuboidal modules 18 and/or 18a to 18c are formed by the sandwich plates 11 of the rear chassis 4. Modules 18 are defined by the bottom chord, not shown, the top chord 14, the aforementioned crossmembers 13a, 13b and 13d and a further crossmember 13c as well as the two longitudinal members 12a, 12b. The module 18c furthest to the rear, viewed in the direction of travel F17, is configured in the region of the rear wheel suspension fastening means 8, 9, wherein the module is defined amongst other things by the crossmembers 13c and 13d. In this case, the third crossmember 13c, viewed in the direction of travel F17, is located upstream of a point of installation 19 for the rear wheels 20 and the fourth and/or rearmost crossmember 13d, viewed in the direction of travel F17, is located downstream of the point of installation 19 for the rear wheels 20. By this positioning of the rearmost and/or third module 18c, a stable construction is provided for fastening the rear wheels. By means of the modules 18a and 18b, which are located upstream of the third module 18c, viewed in the direction of travel F17, the rear chassis 4 as far as the front chassis 3 is designed to be flexurally rigid and torsionally rigid. In FIG. 3, it may also be seen that the second, third and fourth crossmembers 13b, 13c, 13d in each case have a through-hole 28. As a result, a tunnel 29 is produced in the three-dimensional structure which leads to the first crossmember 13a in the direction of travel F17. By means of this tunnel 29, a particularly flexible use of the modules 18 is possible, as the modules may be loaded via the tunnel 29 and lines may be laid through the tunnel 29. The usefulness of the modules 18 is also increased by through-holes 40 and/or 41 in the left-hand longitudinal member and/or right-hand longitudinal member 12a, 12b. The rear wheel fastening means 9 are designed as bores 9a.

Figure 4:
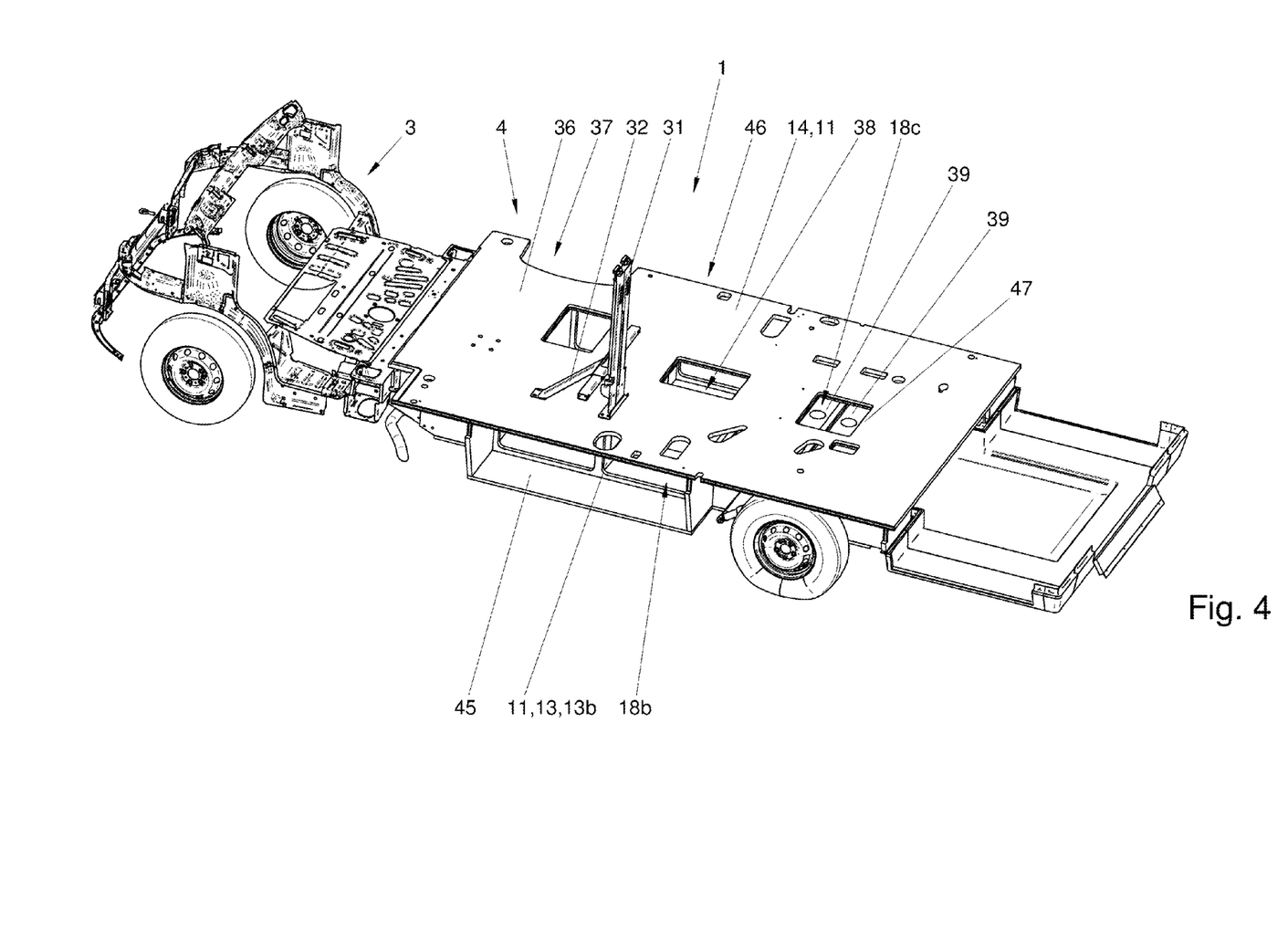

In FIG. 4 the road vehicle chassis 1 shown in FIG. 1 is now shown in a perspective view obliquely from above. In this view, it may be seen that the sandwich plate 11 which forms the top chord 14 is configured as a one-piece sandwich plate. Containers 39 may be seen through a recess 47 in the top chord 14, the containers being arranged in the third module 18c. The containers 39 are designed as a fresh water tank and a waste water tank. The aforementioned seat belt bracket 31 is supported by a side arm 32 on the top chord 14. For further fastening, the seat belt bracket 31 passes through the top chord 14 and is also connected to the second crossmember 13b. By means of the storage compartment attachments 45, 46, a storage space available via the modules 18a to 18c is increased, wherein the storage compartment attachments 45, 46 may be closed by flaps in a vehicle entirely constructed on a road vehicle chassis 1. Insofar as such a vehicle is configured as a motorhome and/or campervan, the top chord 14 forms a bottom surface 36 of a living space 37 of the motorhome.

According to a variant, the module 18b is provided for the arrangement of supply units 38, such as for example an independent vehicle heater. According to a variant, not shown, each individual module is provided for receiving stored goods and/or one or more tanks and/or one or more units, so that the rear chassis is able to be used in a flexible manner, adapted to individual requirements. In this case, the module concept also permits a change of use, such as for example retrofitting water tanks or the provision of further units.

Figure 5:
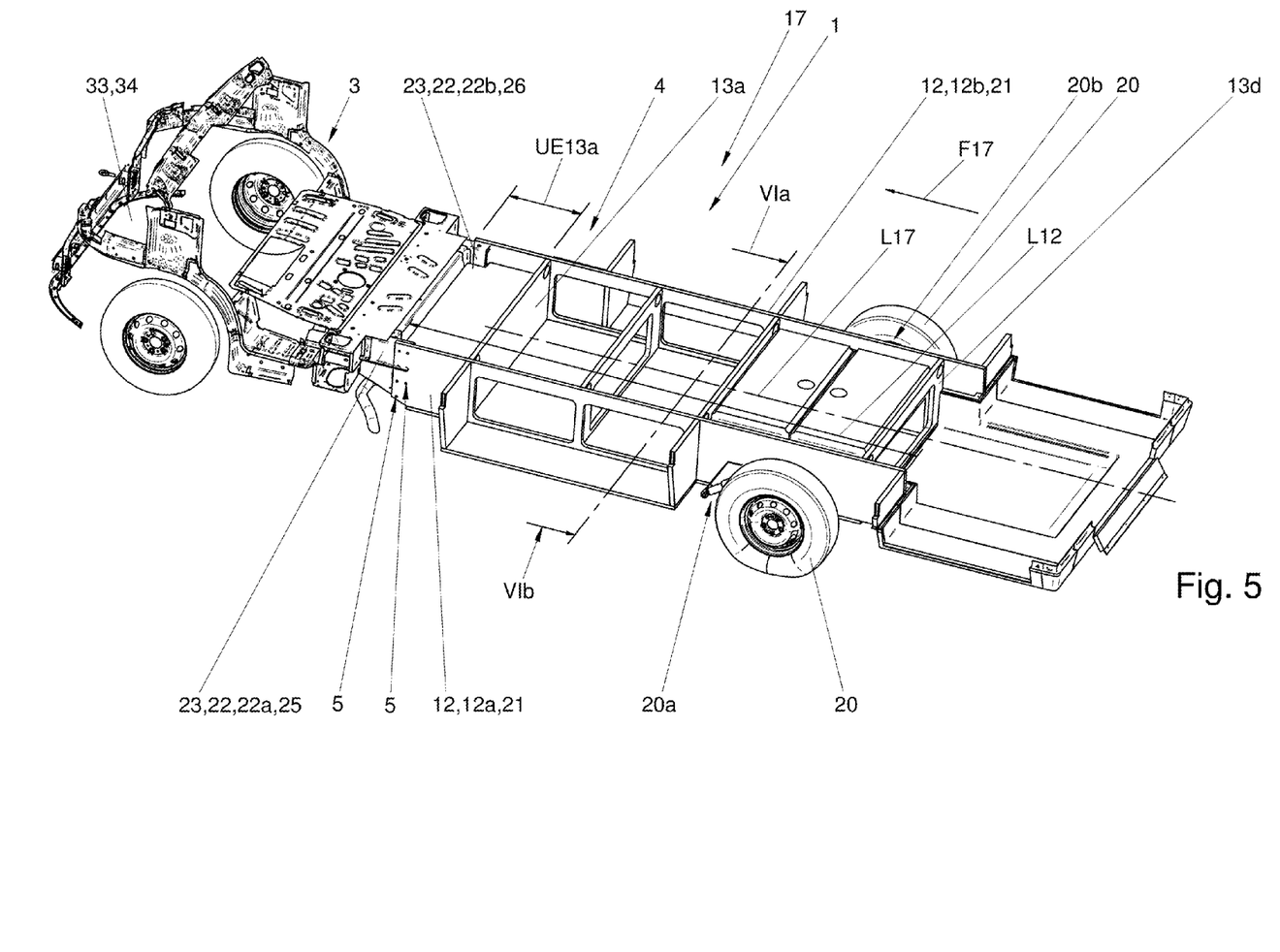

In FIG. 5, the road vehicle chassis 1 is shown according to the view of FIG. 4, wherein the top chord is omitted. As a result, it may be seen how the rear chassis 4 is connected to the front chassis 3 via its longitudinal members 12a, 12b, wherein the longitudinal members 12a, 12b are coupled to supporting members 22 and/or 22a, 22b via the flange means 5. In this case, the longitudinal members 12a, 12b form connecting points 21 of the rear chassis 4 and the supporting members 22a, 22b form connecting points 23 of the front chassis 3. The supporting members 22a and 22b in each case are configured as hollow profiles 25 and/or 26. The flange means 5 comprise screws and nuts. Moreover, it is also provided to use gusset plates as flange means in order to introduce force into the longitudinal members over a large surface area. When constructing a road vehicle 17 based on the road vehicle chassis 1, the front chassis 3 is provided with an engine 33 (only shown symbolically), which is configured, in particular, as an internal combustion engine 34. The vehicle 17 has a vehicle longitudinal axis L17 which passes through the front chassis 3 and the rear chassis 4. In the direction of travel F17, the longitudinal members 12 have a projection UE13a over the crossmember 13a furthest to the front and an overall length L12. According to a variant, not shown, the supporting members 22a and 22b are configured as flat profiles or angled profiles.

Figure 6A:
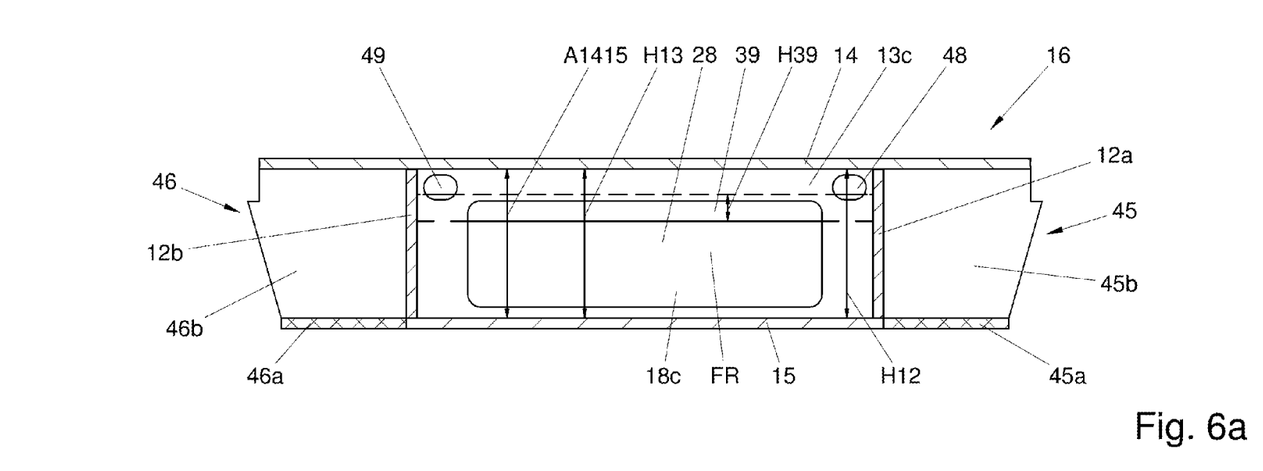
FIGS. 6a and 6b show sectional views of the vehicle chassis shown in FIGS. 1 to 5.

In FIG. 6a, a section is shown through the rear chassis 4 of the road vehicle chassis 1 corresponding to the cutting line VIa to VIa shown in FIG. 5, wherein the top chord 14 is also shown in the sectional view. In FIG. 6a it may be seen that the longitudinal members 12a, 12b and the crossmember 13c—in a similar manner to the other non-visible crossmembers—extend between the top chord 14 and the bottom chord 15. The top chord 14 and the bottom chord 15 extend parallel to one another and are at a distance A1415 from one another which corresponds to a height H12 of the longitudinal members 12 and/or a height H13 of the crossmembers 13. In the sectional view of FIG. 6a, from the left-hand storage compartment attachment and right-hand storage compartment attachment 45, 46 in each case a bottom plate 45a and/or 46a and a side wall 45b, 46b are visible, wherein the bottom plates 45a, 46a form a continuation and/or extension of the bottom chord 15 and wherein the side walls 45b, 46b form a continuation and/or extension of the crossmember 13c, but without being a load-bearing component of the three-dimensional structure 16. In addition to the through-hole 28, the crossmember 13c also has two bores 48, 49 which are provided for passing through lines. As is visible from viewing FIGS. 4, 5 and 6a together, the two containers 39 are arranged in the third module 18c. In spite of the arrangement of the containers 39 in the module 18c, in order to maintain the possibility of loading items from the fourth crossmember 13d through to the first crossmember 13a (see FIG. 5), the containers 39 have a height H39 which is less than a distance A1415 between the top chord 14 and the bottom chord 15 (see FIG. 6a). As a result, in the arrangement shown, a free space FR remains below the containers 39 so that the module 18c may also be used as a storage space in which, for example, sports equipment such as skis or snowboards may be inserted. For obtaining optimal loading capacity below the containers, the suspension units 20a and 20b for the rear wheels 20 are designed as independent wheel suspension units. As a result, it is avoided that an axle passes through the module 18c.

Figure 6B:
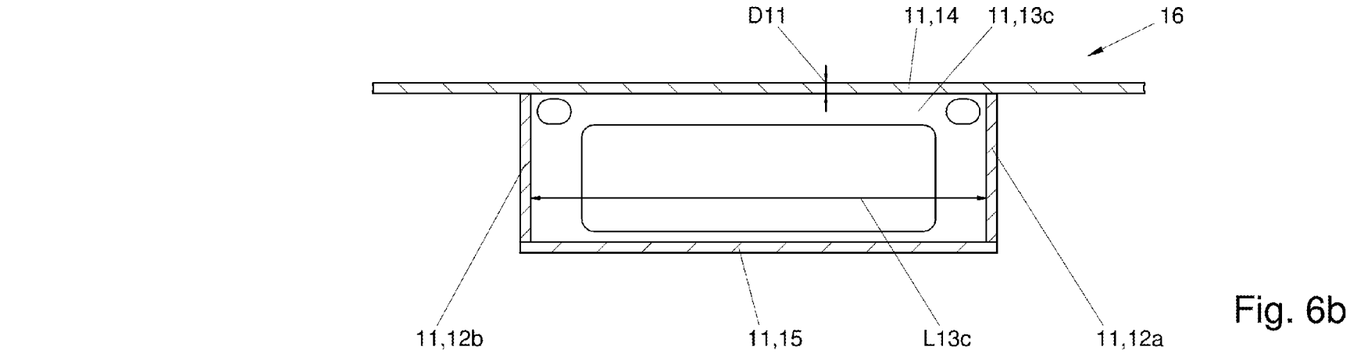

In FIG. 6b, the sectional view of FIG. 6a is shown omitting the two storage compartment attachments and the containers, so that only the load-bearing sandwich plates 11 of the three-dimensional structure 16 are shown. All sandwich plates 11 used for the load-bearing three-dimensional structure (16) have a plate thickness D11. The crossmember 13c has a length L13c—as do all of the other crossmembers.

Figure 7:
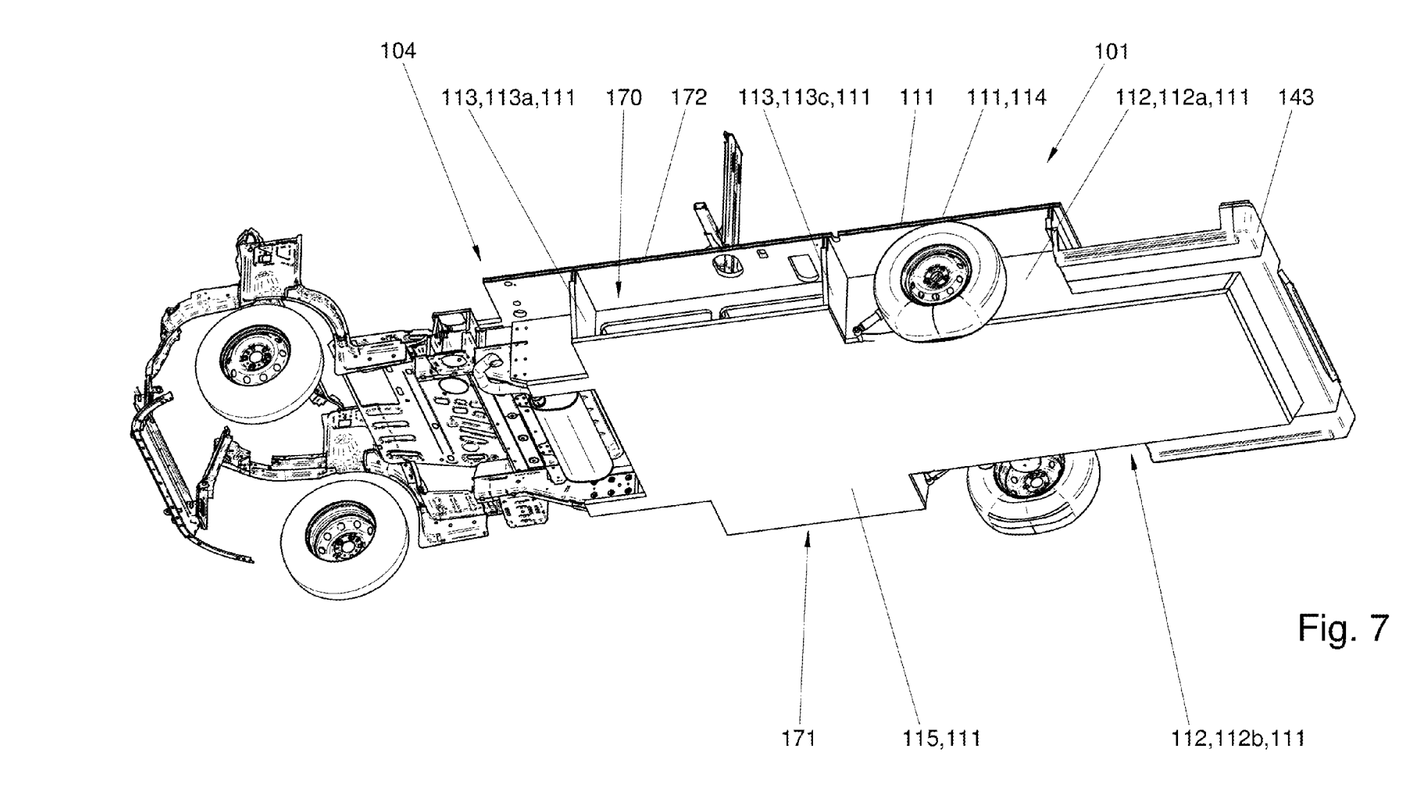
FIGS. 7 and 8: show perspective views of a second variant of a vehicle chassis.
Figure 8:
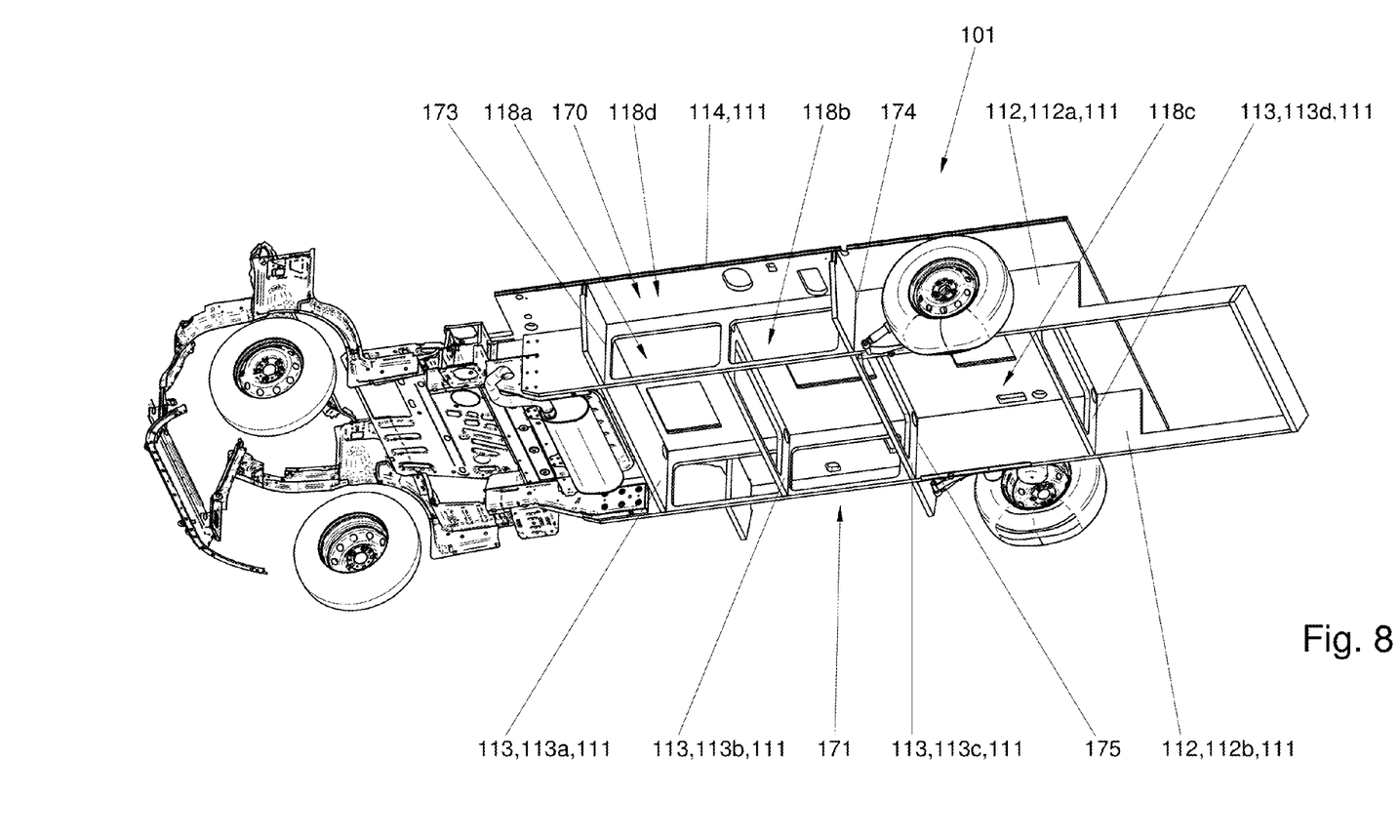

In FIGS. 7 and 8, a second variant of a road vehicle chassis according to the invention 101 is shown obliquely from below. In comparison to the view of the first variant in FIG. 1, it may be seen that a bottom chord 115 of a rear chassis 104 in the second variant is designed to be wider and longer and that the longitudinal members 112 and/or 112a, 112b are also designed to be longer. By this extended design of the load-bearing sandwich plates 111, a rear attachment 143 is also supported thereby and, as a result, able to be designed with less rigidity and thus more cost-effectively. Moreover, the connection of the rear attachment 143 to the sandwich plates 111 is thus simplified. In the second variant, storage compartments 170, 171 are formed by the load-bearing sandwich plates 111, wherein to this end a first crossmember and a third crossmember 113a, 113c from a total of four crossmembers 113 protrude at least to the left or right over the longitudinal members 112a, 112b and support a top chord 114 as far as at least one of its longitudinal side edges 172.

The path of the longitudinal members 112 and crossmembers 113 is visible in FIG. 8, showing the view of FIG. 7 with the bottom chord removed and with the rear attachment removed. The second and fourth crossmembers 113b, 113d extend between the longitudinal members 112a and 112b as in the first variant. The longitudinal members 112 and/or 112a, 112b and crossmembers 113 and/or 113a, 113b are configured at points of intersection 173, 174, 175 such that both the longitudinal members 112 and the crossmembers 113 have a slot opening toward the top chord 114 and/or the bottom chord 115, wherein the two slots permit the two sandwich plates 111 to be interlocked such that the sandwich plates 111 intersect one another on edge between the top chord 114 and the bottom chord 115. Therefore, in addition to the three modules 118a, 118b and 118c located between the longitudinal members 112a and 112b, a further module 118d located to the side adjacent to the modules 118a and 118b, which additionally stabilizes and reinforces the rear chassis 104, is formed between the first crossmember and the third crossmember 113a, 113c, the left-hand longitudinal member 112a, the top chord 114 and the bottom chord 115, omitted in FIG. 8 (see FIG. 7). According to a variant, not shown, it is provided in each case to arrange at least two further modules to the left and/or right, adjacent to modules 118a to 118c arranged in the center of the vehicle.

Figure 9:
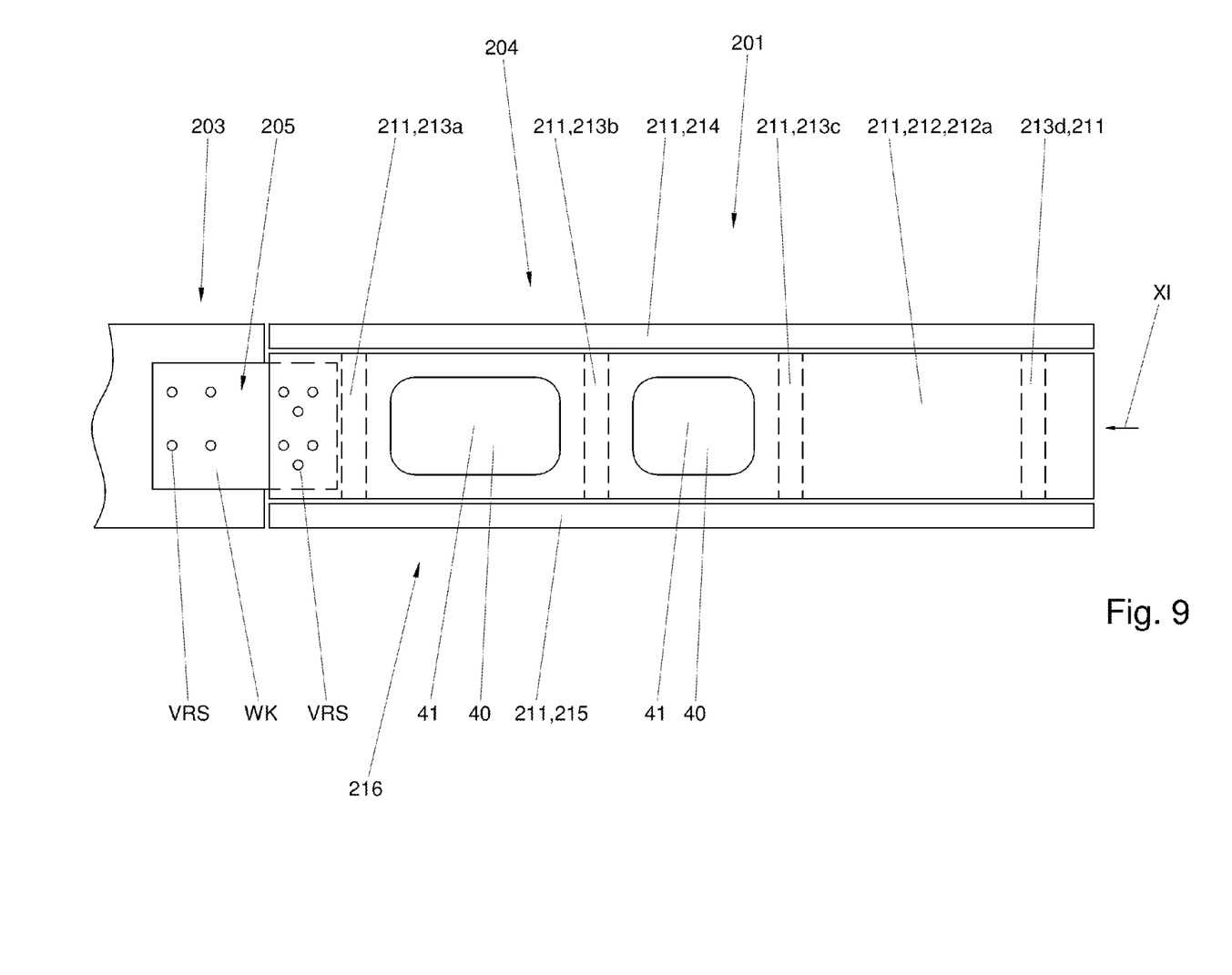
FIGS. 9 to 11 show different views of a third variant of a vehicle chassis.
Figure 10:
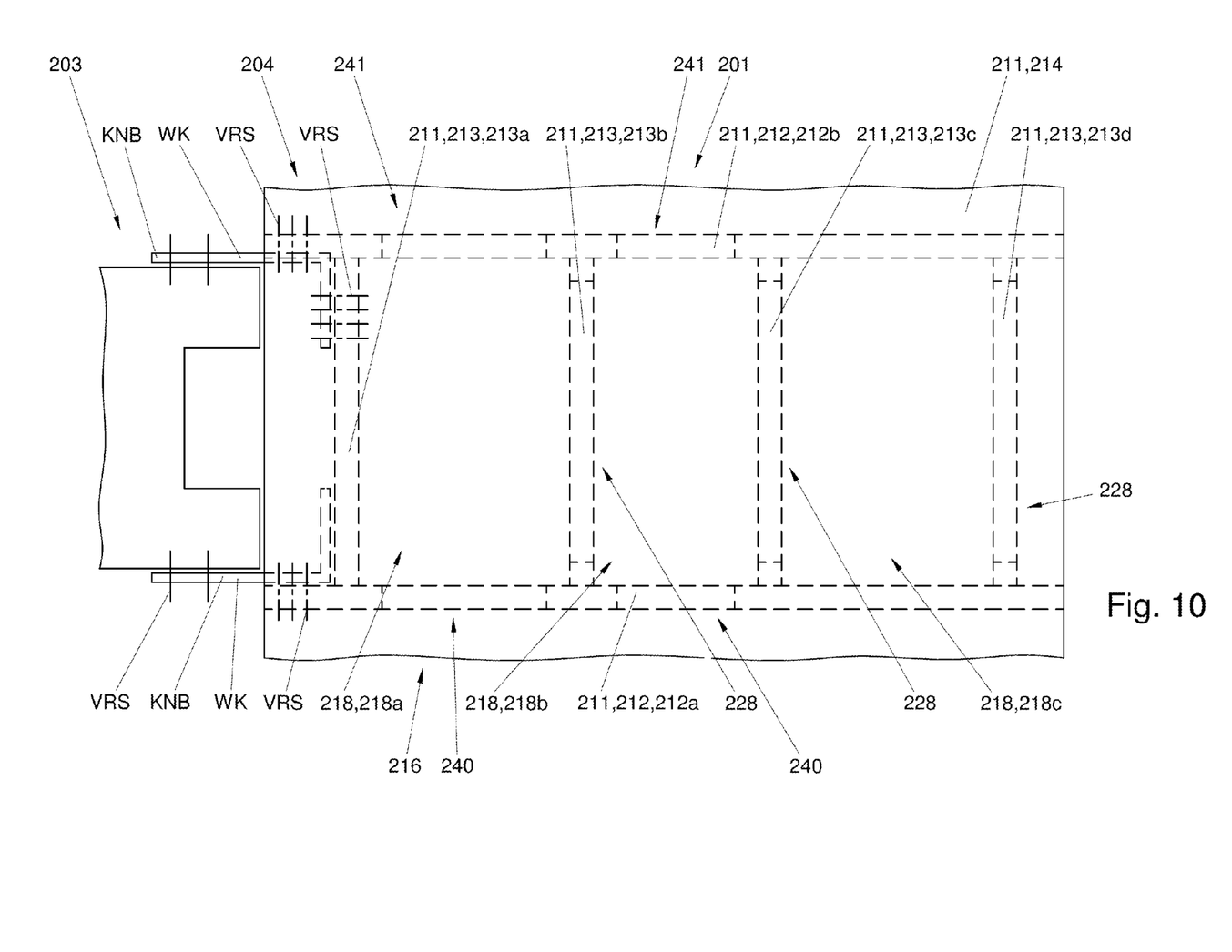
Figure 11:
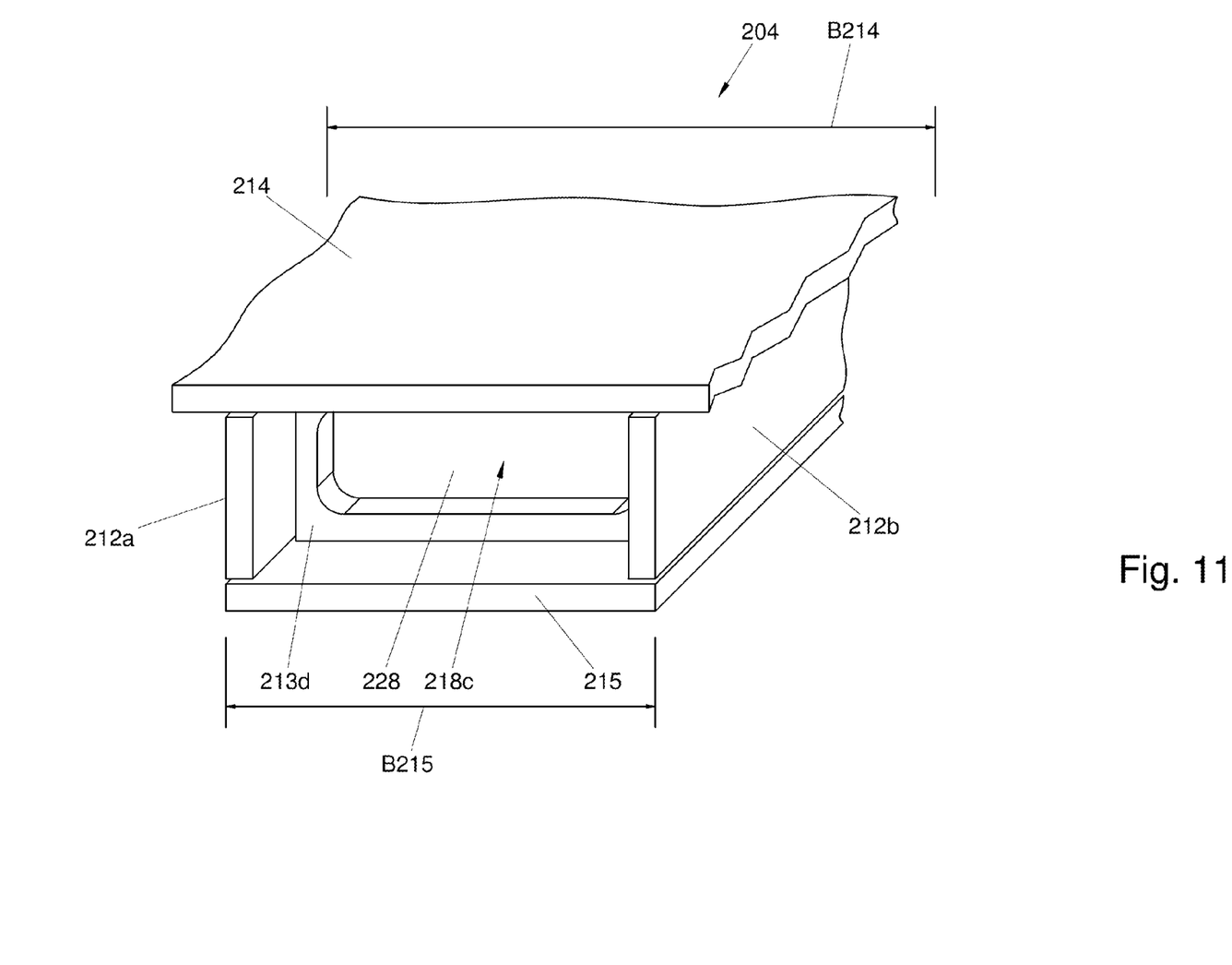

In FIGS. 9 to 11, different views of a third variant of a road vehicle chassis 201 are shown. In this case, FIG. 9 shows a side view of a rear chassis 204 which is connected by flange means 205 to a front chassis 203, only partially shown. The flange means 205 comprise angle brackets WK as gusset plates KNB and screw connections VRS as fastening means (see FIGS. 9 and 10). The rear chassis 204 comprises eight sandwich plates 211 which are configured as the top chord 214, bottom chord 215, two longitudinal members 212 and/or 212a and 212b and four crossmembers 213 and/or 213a to 213d (see also FIG. 10). The sandwich plates 211 are connected together by screw connections and/or bonded connections and/or positive interlocking, not shown, to form a stable three-dimensional structure 216, wherein the longitudinal members 212a and 212b have through-holes 240 and/or 241. In a plan view shown in FIG. 10 of the road vehicle chassis 201, in addition to the through-holes 240, 241 in the longitudinal members 212 through-holes 228 in the rear three crossmembers 213b to 213d are also visible. As a result of the through-holes, modules 218 and/or 218a to 218c formed between the sandwich plates 211 are easily accessible and able to be used in a variable manner, and the weight of the rear chassis 204 is further reduced by the configuration of the through-holes. The rear chassis 204 according to the arrow line XI shown in FIG. 9, is shown from the rear in a perspective view in FIG. 11. In the perspective view, the rear crossmember 213d is visible with its through-hole 228, through which the rear module 218c is accessible. In FIGS. 9 to 11, the sandwich plate 211 which forms the top chord 214 is shown broken off toward its longitudinal edges. According to a preferred embodiment, the top chord 214 has a width B214 which is 1.2 to 3 times and, in particular, 1.5 times to 3 times the width B215 of the bottom chord 215, transversely to a direction of travel F217.

Figure 12:
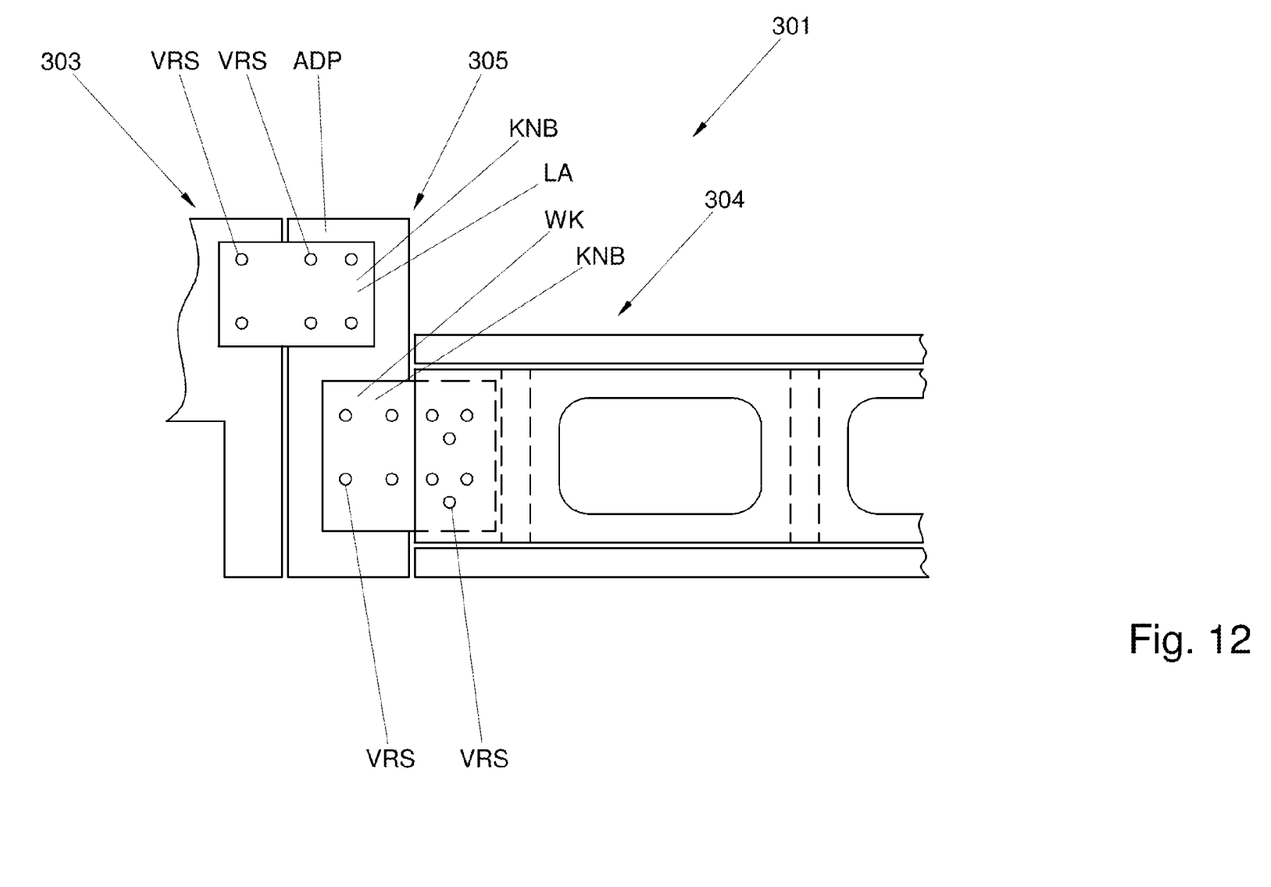
FIG. 12 shows a side view of a fourth variant of a vehicle chassis.

Finally, a further variant to the road vehicle chassis, shown in FIGS. 9 to 11, is shown in FIG. 12. In the road vehicle chassis 301 shown, the flange means 305 comprise an adapter ADP through which a front chassis 303 is adapted to a rear chassis 304. The flange means 305 also comprise for the attachment angle brackets WK and fish-plates LA as gusset plates KNB, as well as screw connections VRS as fastening means.

The invention is not limited to the exemplary embodiments shown or described. More specifically, the invention comprises developments of the invention within the scope of the protected claims.

LIST OF REFERENCE NUMERALS

1 Road vehicle chassis
2 Motorhome chassis
3 Front chassis
4 Rear chassis
5 Flange means between 3 and 4
6, 7 Front wheel suspension fastening means to 3
8, 9 Rear wheel suspension fastening means to 4
9a Bore
10 Lightweight sandwich construction chassis
11 Sandwich plate
12; 12a, 12b Longitudinal member
13; 13a-13d Crossmember
14 Top chord
15 Bottom chord
16 Three-dimensional structure
17 Road vehicle
18; 18a-18c Cuboidal module
19 Point of installation
20 Rear wheels
20a Suspension unit for 20
20b Suspension unit for 20
21 Connecting point
22 Supporting member for 3
23 Connecting points
24 Metal chassis
25 Hollow profile
26 Hollow profile
27 —remains blank—
28 Through-hole in 13
29 Tunnel
30 —remains blank—
31 Seat belt bracket
32 Side arm
33 Engine
34 Internal combustion engine
35 Front wheel
36 Bottom surface
37 Living space
38 Supply unit
39 Container
40 Through-hole in 12a
41 Through-hole in 12b
42 Underbody
43 Rear attachment
44 Trough-shaped attachment
45 Left-hand storage compartment attachment
45a Bottom plate of 45
45b Side wall of 45
46 Right-hand storage compartment attachment
46a Bottom plate of 46
46b Side wall of 46
47 Recess in 14
48, 49 Bore in 13c
101 Road vehicle chassis
104 Rear chassis
111 Sandwich plate
112 Longitudinal member
112a, 112b Left-hand longitudinal member, right-hand longitudinal member member
113 Crossmember
113a, 113c First crossmember, third crossmember
114 Top chord
115 Bottom chord
118a-118d Module
143 Rear attachment
170, 171 Storage compartment
172 Longitudinal side edge of 114
173-175 Point of intersection
201 Road vehicle chassis
203 Front chassis
204 Rear chassis
205 Flange means
211 Sandwich plate
212, 212a, 212b Longitudinal member
213, 213a-213b Crossmember 214 Top chord
215 Bottom chord
216 Three-dimensional structure
218, 218a-218c Modules
228 Through-hole
240, 241 Through-hole
301 Road vehicle chassis
303 Front chassis
304 Rear chassis
305 Flange means
ADP Adapter
A1415 Distance between 14 and 15
B14 Width of 14
B15 Width of 15
B214 Width of 214
B215 Width of 215
D11 Plate thickness of 11
FR Free space below 39 in 18c
F17 Direction of travel of 1 and/or 17
F217 Direction of travel
H12 Height of 12
H13 Height of 13
H39 Height of 39
KNB Gusset plate
LA Fish-plate
L12 Length of 12
L13c Length of 13c
L17 Longitudinal vehicle axis
UE13a Projection of 12 over 13a
UE13d Projection of 12 over 13d
VRS Screw connection
WK Angle bracket

The invention claimed is:

1. A road vehicle chassis, in particular motorhome chassis and campervan chassis, comprising:
a front chassis,
a rear chassis and
flange means,
wherein the front chassis and the rear chassis are connected together to form the road vehicle chassis by the interposition of the flange means and
wherein the front chassis comprises front wheel suspension fastening means and the rear chassis comprises rear wheel suspension fastening means,
wherein the rear chassis is configured as a lightweight sandwich construction chassis,
wherein the lightweight sandwich construction chassis comprises a plurality of sandwich plates,
wherein the sandwich plates are configured as longitudinal members, crossmembers, a top chord and a bottom chord,
wherein the sandwich plates are connected together such that said sandwich plates form a three-dimensional structure,
wherein said three-dimensional structure is defined at the top by the top chord and at the bottom by the bottom chord, and
wherein adjacent sandwich plates are connected together.

2. The road vehicle chassis according to claim 1, wherein the lightweight sandwich construction chassis comprises at least two longitudinal members which are configured such that said longitudinal members are both connected by one of the flange means to the front chassis and comprise the rear wheel suspension fastening means, wherein the rear wheel suspension fastening means are configured, in particular, as bores incorporated in the longitudinal members and/or as threaded portions incorporated in the longitudinal members and/or as threaded bolts arranged on the longitudinal member and/or as a bonded connection.

3. The road vehicle chassis according to claim 1,
wherein the three-dimensional structure of the rear chassis is configured as a self-supporting three-dimensional structure,
wherein said three-dimensional structure is configured, in particular, such that by the sandwich plates which are connected together at least three, in particular cuboidal, modules are formed and arranged, in particular, symmetrically to a vehicle longitudinal axis, said modules being arranged in the direction of travel, in particular in succession and adjacent to one another,
wherein one of the modules is arranged, in particular, such that the first crossmember defining the module is arranged in the direction of travel upstream of a point of installation for rear wheels, and in that the second crossmember defining the module is arranged in the direction of travel downstream of the point of installation for the rear wheels,
wherein the sandwich plates used for the three-dimensional structure have a plate thickness, in particular, of between 20 mm and 40 mm and preferably of 25 mm to 35 mm,
wherein the top chord and the bottom chord are at a distance relative to one another of 350 mm to 450 mm and preferably of 400 mm to 430 mm and
wherein the longitudinal members, in particular, have a length of 2 m to 4 m and preferably of 3 m to 3.6 m.

4. The road vehicle chassis according to claim 1, wherein the flange means connect the longitudinal members of the rear chassis which form connecting points of the rear chassis and the supporting members of the front chassis which form connecting points of the front chassis.

5. The road vehicle chassis according to claim 1, wherein the front chassis is configured as a metal chassis.

6. The road vehicle chassis according to claim 4, wherein at least one connecting point of the front chassis is configured as a hollow profile and in that at least one connecting point of the rear chassis is formed by one of the longitudinal members, wherein the longitudinal member is connected to the hollow profile such that the longitudinal member protrudes into the hollow profile and is connected by the flange means to the hollow profile or in that the longitudinal member bears externally against the hollow profile and is connected by the flange means to the hollow profile.

7. The road vehicle chassis according to claim 1, wherein the rear chassis has at least three, and in particular four, crossmembers which pass through the rear chassis.

8. The road vehicle chassis according to claim 7, wherein at least two, and in particular three, adjacent crossmembers in each case have a through-hole so that a tunnel which extends in the longitudinal direction of the vehicle is formed between the top chord and the bottom chord.

9. The road vehicle chassis according to claim 1, wherein the individual flange means comprise at least one gusset plate for connecting the front chassis and the rear chassis, wherein the gusset plate is connected, and in particular screwed, to the front chassis and the rear chassis.

10. The road vehicle chassis according to claim 1, wherein a seat belt bracket is connected to one of the longitudinal members and/or one of the crossmembers and is supported, in particular, by a side arm on the top chord.

11. The road vehicle chassis according to claim 1, wherein the lightweight sandwich construction chassis is either configured such that the top chord in the direction of travel protrudes laterally on both sides over the bottom chord, wherein the top chord protrudes laterally over the longitudinal members and wherein the bottom chord terminates flush with the longitudinal members to the side, wherein in particular at least one of the crossmembers exclusively extends between the longitudinal members and, in particular, has a length of 1.2 m to 1.4 m and preferably of 1.25 m to 1.35 m or wherein, in particular, at least one of the crossmembers protrudes on both sides over the longitudinal members and has, in particular, a length of 2 m to 2.5 m and preferably a length of 2.2 m to 2.3 m or is configured such that the top chord and the bottom chord protrude laterally on both sides over the longitudinal members, wherein, in particular, at least one of the crossmembers protrudes on both sides over the longitudinal members and, in particular, has a length of 2 m to 2.5 m and preferably a length of 2.2 m to 2.3 m.

12. The road vehicle chassis according to claim 9, wherein the flange means comprise at least one adapter which is arranged between the front chassis and the rear chassis.

13. A road vehicle having a road vehicle chassis according to claim 1, and wherein the road vehicle comprises an engine, in particular an internal combustion engine, which is mounted in the front chassis and drives front wheels or front wheels and rear wheels.

14. A road vehicle having a road vehicle chassis according to claim 1, and wherein the road vehicle comprises an engine, in particular an internal combustion engine, which is mounted in the rear chassis and drives rear wheels or rear wheels and the front wheels.

15. A road vehicle having a road vehicle chassis, according to claim 13, wherein the top chord of the rear chassis, in particular, forms a bottom surface of a living space, wherein supply units and/or containers are arranged, in particular, between the top chord and the bottom chord in modules defined by the longitudinal members and the crossmembers, wherein at least one of the modules, in particular, is accessible through a through-hole in one of the two crossmembers which define the module, wherein at least one of the modules is accessible, in particular, through a through-hole in the left-hand longitudinal member and, in particular, through a through-hole in the right-hand longitudinal member, wherein the top chord and/or the bottom chord is and/or are configured, in particular, as (an) individual sandwich plate(s) which counter to the direction of travel protrude over rear wheels of the road vehicle, wherein the longitudinal members protrude, in particular, over the crossmember furthest to the front and/or over the crossmember (furthest to the rear, wherein a projection over the crossmember furthest to the front is, in particular, at least 20 cm, wherein a projection over the crossmember furthest to the rear is, in particular, at least 20 cm.

\* \* \* \* \*